(12) United States Patent
Shukla et al.

(10) Patent No.: US 12,235,884 B2
(45) Date of Patent: Feb. 25, 2025

(54) FACILITATING REDUCTION OF NOISE IN NON-STANDARD PRINTED CIRCUIT BOARD ASSEMBLY COMPONENT DESCRIPTIONS USING A ZERO-SHOT MODEL TO IDENTIFY SALIENT COMPONENT CLASS DESCRIPTIONS

(71) Applicant: Dell Products L.P., Round Rock, TX (US)

(72) Inventors: Ravi Shukla, KA (IN); Jeffrey Vah, Round Rock, TX (US); Jerrold Cady, Georgetown, TX (US); Bharathi Raja Kalyanasundaram, Tamil Nadu (IN); Aaron Sanchez, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 271 days.

(21) Appl. No.: 17/975,484

(22) Filed: Oct. 27, 2022

(65) Prior Publication Data

US 2024/0143639 A1    May 2, 2024

(51) Int. Cl.
*G06F 16/34*    (2019.01)
*G06F 40/30*    (2020.01)
(Continued)

(52) U.S. Cl.
CPC ............ *G06F 16/345* (2019.01); *G06F 40/30* (2020.01); *G06F 40/40* (2020.01); *G06N 5/022* (2013.01); *G06N 20/00* (2019.01)

(58) Field of Classification Search
CPC ........ G06F 16/345; G06F 40/30; G06F 40/40; G06N 5/022; G06N 20/00
(Continued)

(56) References Cited

U.S. PATENT DOCUMENTS

| 6,408,294 B1 * | 6/2002 | Getchius | G06F 16/951 707/999.005 |
| 6,850,900 B1 * | 2/2005 | Hare | G06Q 40/04 705/26.8 |

(Continued)

FOREIGN PATENT DOCUMENTS

CN    117056938 A   * 11/2023

OTHER PUBLICATIONS

"Wikipedia 1.4.0—pip install wikipedia" released Nov. 15, 2014 [https://pypi.org/project/wikipedia] retrieved Sep. 22, 2024, 5 pages.
(Continued)

*Primary Examiner* — Edwin S Leland, III
(74) *Attorney, Agent, or Firm* — Amin, Turocy & Watson, LLP

(57) ABSTRACT

Facilitating reduction of noise in non-standard printed circuit board assembly component descriptions using a zero-shot model to identify salient component class descriptions is presented herein. A system receives defined valid label designations(s) representing an accepted domain of component class descriptions; receives defined invalid label designations(s) representing a rejected domain of component class descriptions; and replaces non-alphanumeric characters of respective component descriptions with respective spaces to obtain revised component descriptions, removes, from the revised component descriptions, word(s) that include number(s) to obtain reduced component descriptions, expands, using a defined knowledge base comprising an online library of information, respective words of the reduced component descriptions to obtain respective expanded words representing natural-language expressions of the respective words, and based on the defined valid and invalid label designation(s) and the respective expanded words, selects, using a zero-shot model, words from the
(Continued)

reduced component description for inclusion in a final reduced component description.

20 Claims, 20 Drawing Sheets

(51) Int. Cl.
  *G06F 40/40* (2020.01)
  *G06N 5/022* (2023.01)
  *G06N 20/00* (2019.01)
(58) Field of Classification Search
  USPC .......................................................... 704/9
  See application file for complete search history.

(56) References Cited

U.S. PATENT DOCUMENTS

| 7,225,199 | B1* | 5/2007 | Green | G06F 40/30 |
| | | | | 715/239 |
| 10,705,903 | B2* | 7/2020 | Majumder | G06N 20/00 |
| 11,630,719 | B1* | 4/2023 | Kottapalli | G06F 11/079 |
| | | | | 714/47.3 |
| 2007/0079282 | A1* | 4/2007 | Nachnani | G06F 8/34 |
| | | | | 717/106 |
| 2008/0104542 | A1* | 5/2008 | Cohen | G06F 16/951 |
| | | | | 715/810 |
| 2010/0131923 | A1* | 5/2010 | Oon | G16H 10/60 |
| | | | | 707/769 |
| 2023/0209720 | A1* | 6/2023 | Knox | G01R 31/2805 |
| | | | | 118/712 |
| 2023/0394075 | A1* | 12/2023 | Nguyen | G06Q 10/06316 |
| 2024/0143639 | A1* | 5/2024 | Shukla | G06N 20/00 |

OTHER PUBLICATIONS

"Bart-large-mnli" [https://huggingface.co/facebook/bart-large-mnli] retrieved Sep. 22, 2024, 5 pages.
"BART (large-sized model)" [https://huggingface.co/facebook/bart-large] retrieved Sep. 22, 2024, 4 pages.
"Terms, Definitions, and Letter Symbols for Microelectronic Devices" JESD99C (Revision of JESD99B, May 2012), JEDEC Standard, Dec. 2012, 120 pages.
"Reference Designations for Electrical and Electronics Parts and Equipment" ASME-Y14.44, 2008, 6 pages.
"Graphic Symbols for Electrical and Electronics Diagrams" IEEE Std 315-1975 (Reaffirmed 1993), ANSI Y32.2-1975 (Reaffirmed 1989), CSA Z99-1975, dated Oct. 31, 1975, 264 pages.

* cited by examiner

| WORD | ORIGINAL WORD OF RCD 412 | EXPANDED WORD |
|---|---|---|
| $W_1$ | IC | ic |
| $W_2$ | TPM | trusted platform module |
| $W_3$ | VQFN | flat no-leads package |

| LABEL | TYPE OF LABEL DESIGNATION | $W_i$ OF RCD 412 | EXPANDED WORD | ZERO-SHOT SIMILARITY SCORE |
|---|---|---|---|---|
| IC Packaging | Invalid | IC | ic | 0.7576667422 |
| Computer | Valid | IC | ic | 0.931616843 |
| Electronics | Valid | IC | ic | 0.415579945 |
| Electrical | Valid | IC | ic | 0.362233341 |

Valid Label Score = (0.93 + 0.42 + 0.36)/3 = 0.57

Invalid Label Score = 0.76

Valid Ratio = 0.57/0.76 = 0.75

FIG. 6

| LABEL | TYPE OF LABEL DESIGNATION | $W_2$ OF RCD 412 | EXPANDED WORD | ZERO-SHOT SIMILARITY SCORE |
|---|---|---|---|---|
| IC Packaging | Invalid | TPM | trusted platform module | 0.080142289 |
| Computer | Valid | TPM | trusted platform module | 0.268199563 |
| Electronics | Valid | TPM | trusted platform module | 0.108004093 |
| Electrical | Valid | TPM | trusted platform module | 0.03428040 |

Valid Label Score = (0.27 + 0.11 + 0.03)/3 = 0.14

Invalid Label Score = 0.08

Valid Ratio = 0.14/0.08 = 1.75

FIG. 7

| LABEL | TYPE OF LABEL DESIGNATION | $W_3$ OF RCD 412 | EXPANDED WORD | ZERO-SHOT SIMILARITY SCORE |
|---|---|---|---|---|
| IC Packaging | Invalid | VQFN | flat no-leads package | 0.548304677 |
| Computer | Valid | VQFN | flat no-leads package | 0.702865541 |
| Electronics | Valid | VQFN | flat no-leads package | 0.435379118 |
| Electrical | Valid | VQFN | flat no-leads package | 0.293631285 |

Valid Label Score = (0.70 + 0.44 + 0.29)/3 = 0.48

Invalid Label Score = 0.55

Valid Ratio = 0.48/0.55 = 0.87

FIG. 8

| ORIGINAL WORD OF RCD 412 | Invalid Label Score | Valid Ratio | Excluded from final RCD | Included in final RCD |
|---|---|---|---|---|
| IC | 0.76 | 0.75 | Yes | No |
| TPM | 0.08 | 1.75 | No | Yes |
| VQFN | 0.55 | 0.87 | Yes | No |

FIG. 9

| WORD | ORIGINAL WORD OF RCD 414 | EXPANDED WORD |
|---|---|---|
| $W_1$ | IC | ic |
| $W_2$ | WLCSP | chip-scale package |
| $W_3$ | PWM | pwm |

FIG. 10

| LABEL | TYPE OF LABEL DESIGNATION | $W_1$ OF RCD 414 | EXPANDED WORD | ZERO-SHOT SIMILARITY SCORE |
|---|---|---|---|---|
| IC Packaging | Invalid | IC | ic | 0.757667422 |
| Computer | Valid | IC | ic | 0.931616843 |
| Electronics | Valid | IC | ic | 0.415579945 |
| Electrical | Valid | IC | ic | 0.362233341 |

Valid Label Score = (0.93+ 0.42+0.36)/3 = 0.57

Invalid Label Score = 0.76

Valid Ratio = 0.57/0.76 = 0.75

FIG. 11

| LABEL | TYPE OF LABEL DESIGNATION | $W_2$ OF RCD 414 | EXPANDED WORD | ZERO-SHOT SIMILARITY SCORE |
|---|---|---|---|---|
| IC Packaging | Invalid | WLCSP | chip-scale package | 0.69635593 |
| Computer | Valid | WLCSP | chip-scale package | 0.680010915 |
| Electronics | Valid | WLCSP | chip-scale package | 0.603342116 |
| Electrical | Valid | WLCSP | chip-scale package | 0.127166674 |

Valid Label Score = (0.68 + 0.60 + 0.13)/3 = 0.47

Invalid Label Score = 0.70

Valid Ratio = 0.47/0.70 = 0.67

FIG. 12

| LABEL | TYPE OF LABEL DESIGNATION | W₃ OF RCD 414 | EXPANDED WORD | ZERO-SHOT SIMILARITY SCORE |
|---|---|---|---|---|
| IC Packaging | Invalid | PWM | pwm | 0.12696678 |
| Computer | Valid | PWM | pwm | 0.893471956 |
| Electronics | Valid | PWM | pwm | 0.359041035 |
| Electrical | Valid | PWM | pwm | 0.796513259 |

Valid Label Score = (0.89 + 0.36 + 0.80)/3 = 0.68

Invalid Label Score = 0.13

Valid Ratio = 0.68/0.13 = 5.23

| Original Word of RCD 414 | Invalid Label Score | Valid Ratio | Excluded from final RCD | Included in final RCD |
|---|---|---|---|---|
| IC | 0.76 | 0.75 | Yes | No |
| WLCSP | 0.70 | 0.67 | Yes | No |
| PWM | 0.13 | 5.23 | No | Yes |

FACILITATING REDUCTION OF NOISE IN NON-STANDARD PRINTED CIRCUIT BOARD ASSEMBLY COMPONENT DESCRIPTIONS USING A ZERO-SHOT MODEL TO IDENTIFY SALIENT COMPONENT CLASS DESCRIPTIONS

TECHNICAL FIELD

The subject disclosure generally relates to embodiments for facilitating reduction of noise in non-standard printed circuit board assembly (PCBA) component descriptions using a zero-shot model to identify salient component class descriptions.

BACKGROUND

Due to inconsistency in data entry and data quality, product design and supplier process engineers are limited in extracting insights from historical PCBA component failure data, which can be derived from millions of PCBA repair operations annually. For example, such inconsistency in data entry and data quality stems from the following challenges: reliance on different global PCBA repair partners, optional troubleshooting steps in PCBA test requirements definitions, and/or lack of uniformity in component descriptions provided by original design manufacturers that design and manufacture system motherboards. Further, the lack of uniformity of current standards in defining PCBA component descriptors limits component classification into separate component categories for use in diagnostic and/or predictive analytics domains.

As a result of broad non-standardization across the electronics industry, variation in PCBA component descriptions by manufacturers increases noise in such descriptions, constraining advanced analytics teams from readily gaining insights from component failure data. Furthermore, this variability is amplified across numerous electronic manufacturers and prevents digitization of component data in a standardized manner.

Consequently, conventional manufacturing technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 5 illustrates a first example in generation of expanded words corresponding to respective words $W_1$-$W_3$ of a first RCD, in accordance with various example embodiments;

FIG. 6 illustrates generation of a group of zero-shot similarity scores corresponding to defined valid label designations, defined invalid label designations, and an expanded word $W_1$ of the first RCD, in accordance with various example embodiments;

FIG. 7 illustrates generation of a group of zero-shot similarity scores corresponding to defined valid label designations, defined invalid label designations, and an expanded word $W_2$ of the first RCD, in accordance with various example embodiments;

FIG. 8 illustrates generation of a group of zero-shot similarity scores corresponding to defined valid label designations, defined invalid label designations, and an expanded word $W_3$ of the first RCD, in accordance with various example embodiments;

FIG. 9 illustrates generation of respective averages of zero-shot similarity scores corresponding to defined valid and invalid label designations and associated words of the first RCD, and a determination of whether such words should be excluded from a first final RCD or included in the first final RCD, in accordance with various example embodiments;

FIG. 10 illustrates a second example in generation of expanded words corresponding to respective words $W_1$-$W_3$ of a second RCD, in accordance with various example embodiments;

FIG. 11 illustrates generation of a group of zero-shot similarity scores corresponding to defined valid label designations, defined invalid label designations, and an expanded word $W_1$ of the second RCD, in accordance with various example embodiments;

FIG. 12 illustrates generation of a group of zero-shot similarity scores corresponding to defined valid label designations, defined invalid label designations, and an expanded word $W_2$ of the second RCD, in accordance with various example embodiments;

FIG. 13 illustrates generation of group of zero-shot similarity scores corresponding to defined valid label designations, defined invalid label designations, and an expanded word $W_3$ of the second RCD, in accordance with various example embodiments;

FIG. 14 illustrates generation of respective averages of zero-shot similarity scores corresponding to defined valid and invalid label designations and associated words of the second RCD, and a determination of whether such words should be excluded from a second final RCD or included in the second final RCD, in accordance with various example embodiments;

DETAILED DESCRIPTION

Figure 1:
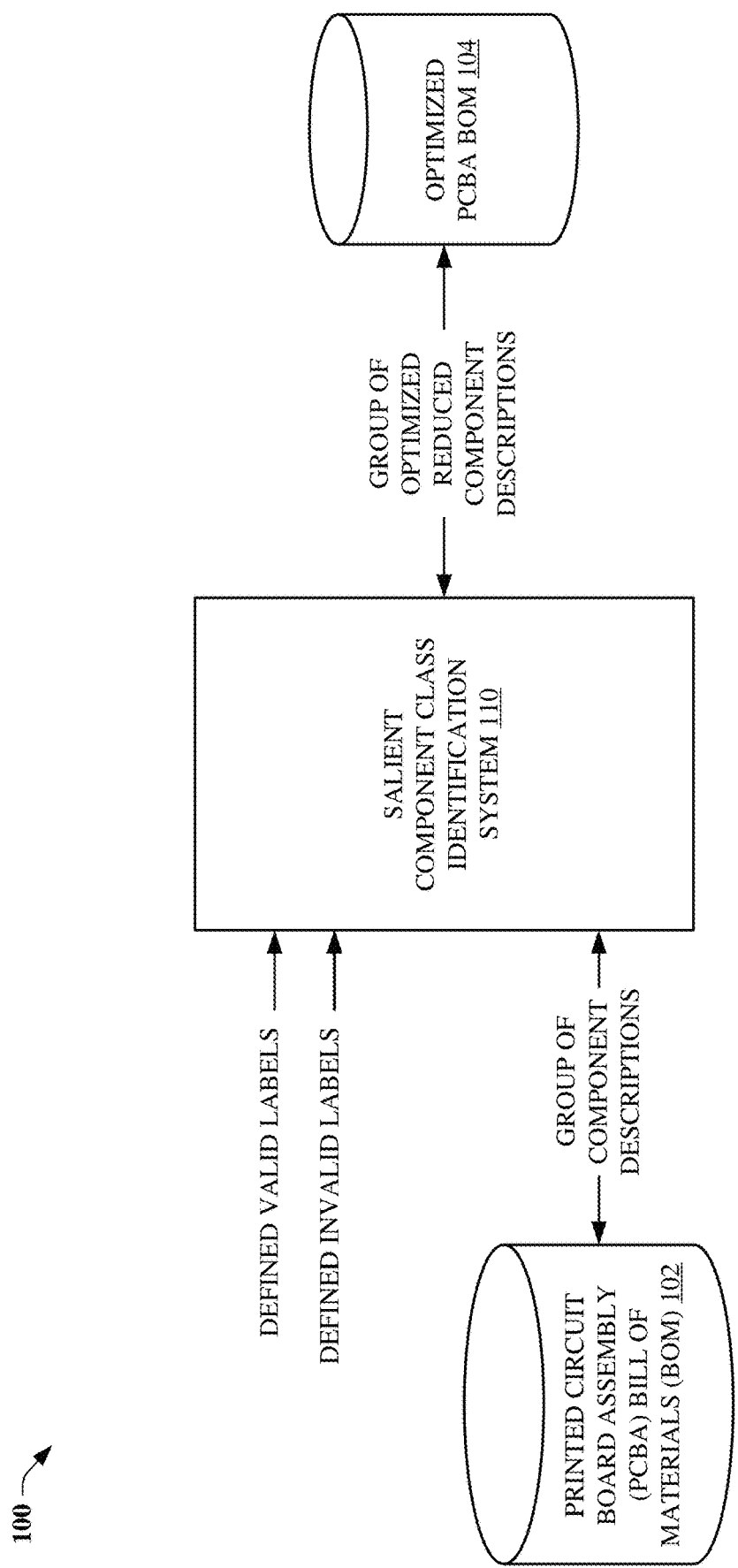
FIG. 1 illustrates a block diagram of a computing environment comprising a salient component class identification system that facilitates reduction of noise in non-standard PCBA component descriptions using a zero-shot model to identify salient component class descriptions, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional manufacturing technologies have had some drawbacks due to inconsistency in data entry and data quality. For example, broad non-standardization of manufacturer PCBA component descriptions has caused an excessive number of component classes of component types including, e.g., integrated circuit (IC), capacitor, resistor, inductor, power converters, and other classes of types of components. In turn, such number of component classes used in an artificial intelligence (AI) and/or machine learning-based model hampers such model's ability to perform predictive analytics corresponding to component failure data. On the other hand, various embodiments disclosed herein can facilitate reduction of noise in non-standard PCBA component descriptions, e.g., due to lack in uniformity of component descriptions, by using a zero-shot model to identify salient component class descriptions.

For example, a system can comprise a processor and a memory that stores executable components that, when executed by the processor, facilitate performance of operations by the system, the operations comprising: receiving a group of defined valid label designations representing an accepted domain of component class descriptions; receiving a group of defined invalid label designations representing a rejected domain of component class descriptions; and for each component description of a group of component descriptions, replacing non-alphanumeric characters of the component description with respective spaces to obtain a revised component description, removing, from the revised component description, words that comprise numbers to obtain a reduced component description (RCD), expanding, using a defined knowledge base comprising an online library of information, respective words of the RCD to obtain respective expanded words representing natural-language expressions of the respective words, and based on the group of defined valid label designations, the group of defined invalid label designations, and the respective expanded words, selecting, using a zero-shot model comprising a pre-trained machine learning model, a group of words from the RCD to be included in a final RCD representing the accepted domain of component class descriptions.

In embodiment(s), the expanding of the respective words further comprises determining, utilizing a python-based interface of a multilingual online encyclopedia maintained by volunteer input, the respective expanded words representing the natural-language expressions of the respective words.

In other embodiment(s), the expanding of the respective words further comprises using a word of the respective words as the expanded word in response to determining that the word cannot be represented by an expanded word of the respective expanded words.

In yet other embodiment(s), the selecting the group of words from the RCD comprises: generating, for an expanded word of the respective expanded words corresponding to a word of the group of words, respective zero-shot similarity scores for the group of defined valid label designations and the group of defined invalid label designations; and based on the respective zero-shot similarity scores, selecting the word to be included in the final RCD.

In embodiment(s), the generating of the respective zero-shot similarity scores further comprises: determining an average valid label zero-shot similarity score of the respective zero-shot similarity scores corresponding to the group of defined valid label designations, e.g., in response to determining that the group of defined valid label designations comprises more than one defined valid label designation; and based on the average valid label zero-shot similarity score, selecting the word to be included in the final RCD.

In other embodiment(s), the operations further comprise: in response to determining that the group of defined invalid label designations comprises more than one defined invalid label designation, determining an average invalid label zero-shot similarity score of the respective zero-shot similarity scores corresponding to the group of defined invalid label designations; and based on the average invalid label zero-shot similarity score, selecting the word to be included in the final RCD.

In this regard, in yet other embodiment(s) the selecting of the word further comprises: including the word in the final RCD in response to determining that a ratio of the average valid label zero-shot similarity score to the average invalid label zero-shot similarity score satisfies a defined condition representing that the word is to be included in the final RCD.

In embodiment(s), a method comprises: obtaining, by a system comprising a processor, a component description; replacing, by the system, non-alphanumeric characters of the component description with respective spaces to obtain a revised component description; removing, by the system, words that comprise numbers from the revised component description, resulting in an RCD; expanding, by the system using a defined knowledge base comprising an online library of information, respective words of the reduced component description to obtain respective expanded words comprising natural-language words representing the respective words; and based on a first group of defined valid label designations, a second group of defined invalid label designations, and the respective expanded words, selecting, by the system using a zero-shot model, a group of the respective words to be included in a final RCD representing an accepted domain of component class descriptions.

In other embodiment(s), the method further comprises: in response to determining that a word of the respective words cannot be represented by an expanded word of the respective expanded words, using, by the system, the word as the expanded word.

In yet other embodiment(s), the selecting of the group of the respective words to be included in the final RCD comprises: generating, for the respective expanded words, respective zero-shot similarity scores corresponding to the group of defined valid label designations and the group of defined invalid label designations; and based on the respective zero-shot similarity scores, selecting the group of the respective words to be included in the final RCD.

In embodiment(s), the generating of the respective zero-shot similarity scores further comprises: determining an average valid label zero-shot similarity score of the respective zero-shot similarity scores corresponding to the group of defined valid label designations; and determining an average invalid label zero-shot similarity score of the respective zero-shot similarity scores corresponding to the group of defined invalid label designations.

In other embodiment(s), the selecting of the group of the respective words to be included in the final RCD further comprises: based on a ratio of the average valid label zero-shot similarity score to the average invalid label zero-shot similarity score, selecting the group of the respective words to be included in the final RCD.

In yet other embodiment(s), a non-transitory machine-readable medium comprises instructions that, in response to execution, cause a system comprising a processor to perform operations, the operations comprising: obtaining a group of defined valid label designations representing an accepted domain of component class descriptions and a group of defined invalid label designations representing a rejected domain of component class descriptions; replacing non-alphanumeric characters of a component description with respective spaces to obtain a revised component description; removing, from the revised component description, words that comprise numbers to obtain an RCD; expanding, using a python-based interface of an online encyclopedic repository of knowledge maintained using volunteer input, respective words of the RCD to obtain respective expanded words representing natural-language expressions of the respective words; determining, via a pre-trained zero-shot machine learning model, respective zero-shot similarity scores corresponding to the group of defined valid label designations, the group of defined invalid label designation, and the respective expanded words; and based on the respective zero-shot similarity scores, removing at least one word of the respective words from the RCD to obtain a final RCD representing the accepted domain of component class descriptions.

In embodiment(s), the removing of the at least one word comprises: determining an average valid label zero-shot similarity score of the respective zero-shot similarity scores corresponding to the group of defined valid label designations and an expanded word of the respective expanded words; determining an average invalid label zero-shot similarity score of the respective zero-shot similarity scores corresponding to the group of defined invalid label designations and the expanded word; and based on a ratio of the average valid label zero-shot similarity score to the average invalid label zero-shot similarity score, removing, from the RCD, a word of the respective words corresponding to the expanded word.

As described above, conventional manufacturing technologies have had some drawbacks due to inconsistency in data entry and data quality. For example, broad non-standardization of manufacturer PCBA component descriptions has caused an excessive number of component classes of component types including, e.g., integrated circuit (IC), capacitor, resistor, inductor, power converters, and other classes of component types. In turn, such number of component classes limits an artificial intelligence (AI) and/or machine learning-based model's ability to perform predictive analytics corresponding to component failure data. On the other hand, various embodiments disclosed herein can facilitate reduction of noise in non-standard PCBA component descriptions, e.g., due to lack in uniformity of component descriptions, by using a zero-shot model to identify salient component class descriptions.

In this regard, in various embodiment(s), the salient component class identification system can transform non-standard component descriptions within a PCBA bill of materials (BOM) (see, e.g., PCBA BOM 102 illustrated by FIG. 1), e.g., such descriptions comprising unstructured data, into reduced descriptions, e.g., a group of optimized reduced component descriptions, by filtering out invalid keywords, digits, and special characters, followed by assignment of a validity ratio score to all words remaining in the reduced description. Each word's validity is generated by applying a pre-defined set of valid and invalid label designations using a pre-trained zero-shot model. Such transformation is complete once derived invalid words are removed, and only most salient classes remain in a refined BOM, e.g., an optimized PCBA BOM (104). In embodiments, the refined BOM can enable extraction of PCBA component failure insights (e.g., selection of a final RCD as a candidate of, or corresponding to, a component failure) based on defined error conditions (e.g., defined electronic device failures, defined computing device failures) using artificial intelligence/machine-learning-based techniques, e.g., including Deep Learning.

It should be appreciated by a person of ordinary skill in the art of failure and/or data analysis having the benefit of the instant disclosure that embodiment(s) disclosed herein are adaptable to pre-defined set(s) of valid and invalid label designations applied in a medical domain, a financial domain, an industrial domain, and other domains in which identifying, from unstructured data, salient classes of entities relevant to such domains can facilitate data analytics corresponding to such domains.

Figure 2:
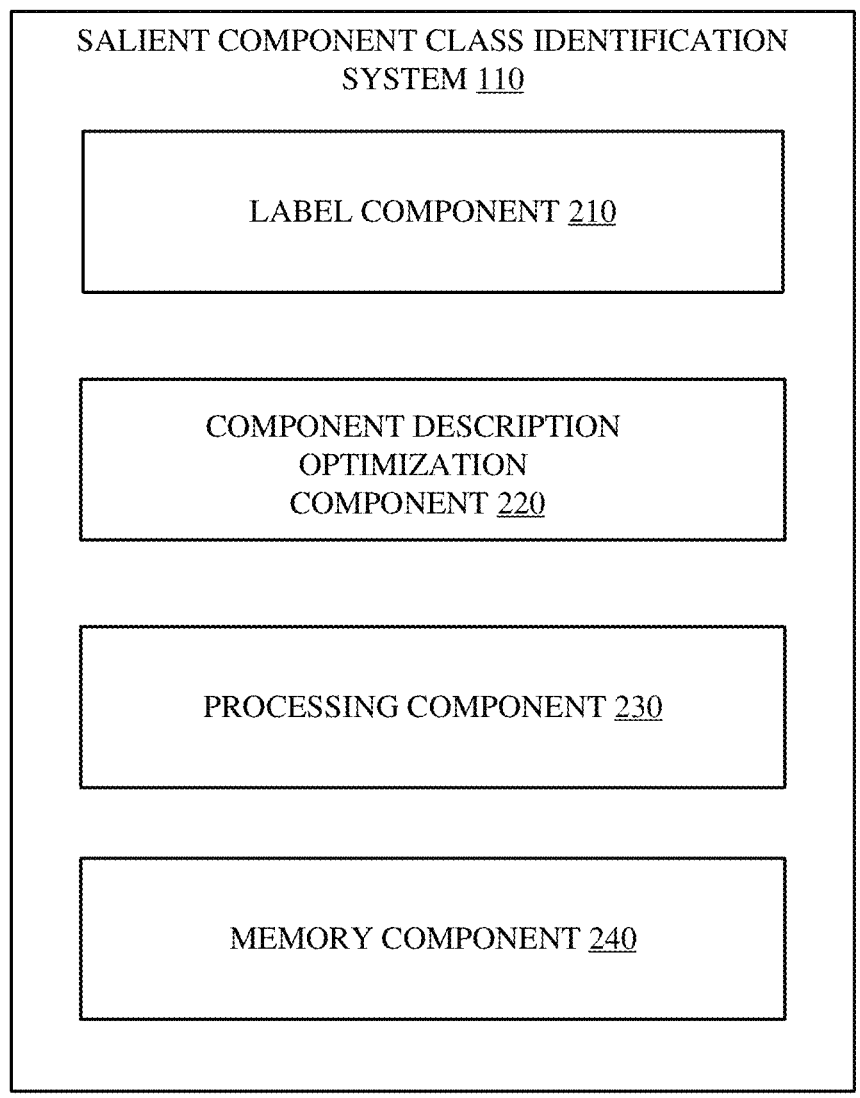
FIG. 2 illustrates a block diagram of a salient component class identification system, in accordance with various example embodiments.
Figure 3:
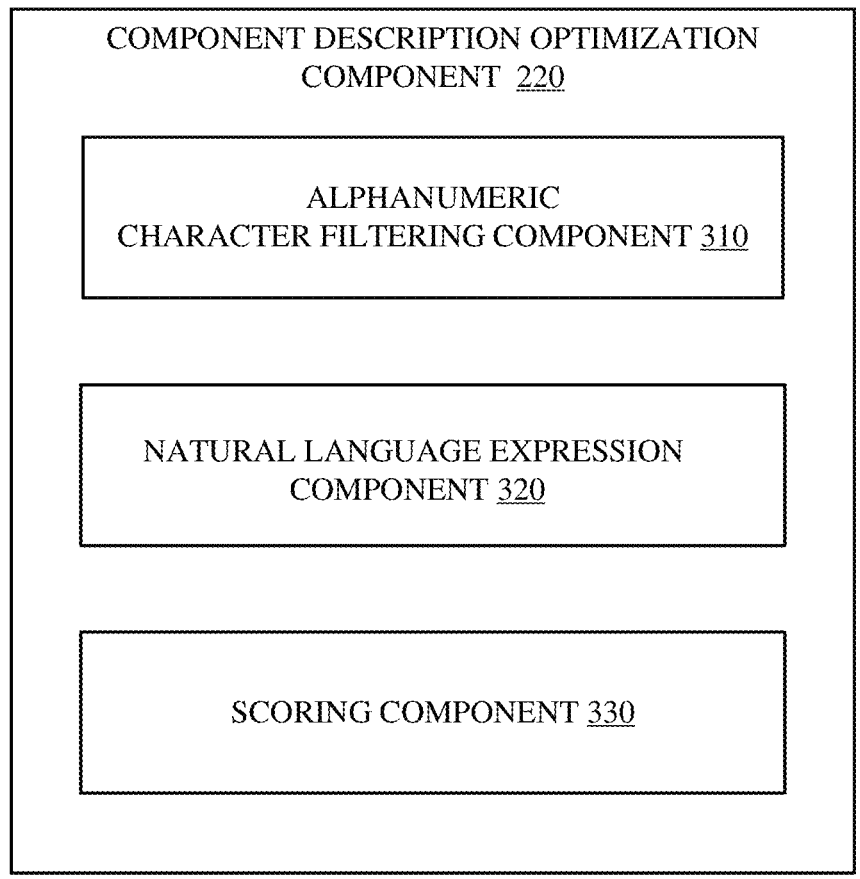
FIG. 3 illustrates a block diagram of a component description optimization component, in accordance with various example embodiments.

Referring now to FIGS. 1-3, block diagrams (100, 200, 300) of a computing environment comprising a salient component class identification system (110) that facilitates reduction of noise in non-standard PCBA component descriptions using a zero-shot model to identify salient component class descriptions; the salient component class identification system (110) comprising a label component (210), a component description optimization component (220), a processing component (230), and a memory component (240); and the component description optimization component (220) comprising an alphanumeric character filtering component (310), a natural language expression component (320), and a scoring component (330) are illustrated, respectively, in accordance with various example embodiments.

The label component receives and/or obtains, e.g., via a data store (not shown) and/or via input(s) obtained via a user interface (not shown), a group of defined valid label designations representing an accepted domain of component class descriptions. In embodiment(s) illustrated by FIGS. 6-8 and 11-13, the defined valid label designations comprise words that describe the accepted domain of component class descriptions from a broad perspective, e.g., "electrical", "electronics", and "computer" for PCBA-based implementations.

Further, the label component receives and/or obtains, e.g., via the data store and/or via the input(s) obtained via the user interface, a group of defined invalid label designations representing a rejected domain of component class descriptions. In embodiment(s) illustrated by FIGS. 6-8 and 11-13, the defined invalid label designations comprise words that are not deemed important for classifying the component type, e.g., "IC Packaging", "IC Form Factor", and similar labels that have been determined to not classify the component type.

It should be appreciated by a person of ordinary skill in the art of component classification having the benefit of the instant disclosure that in other embodiment(s), the example defined invalid label designations (e.g., "IC Packaging", "IC Form Factor", and similar labels) can alternatively represent the defined valid label designations, and correspondingly, the example defined valid label designations (e.g., "electrical", "electronics", and "computer") can alternatively represent the defined invalid label designations.

Figure 4:
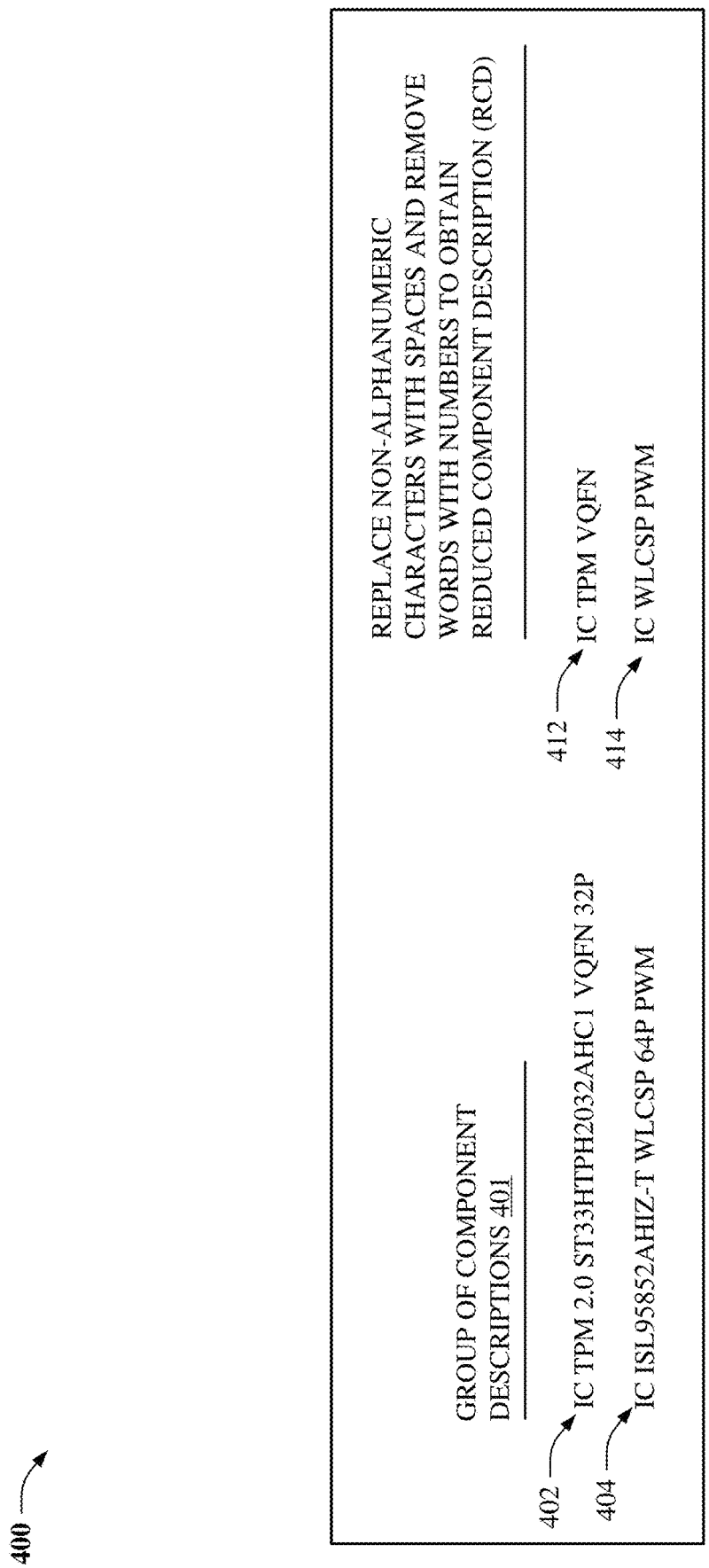
FIG. 4 illustrates replacement of non-alphanumeric characters with spaces and removal of words with numbers within respective component descriptions to obtain each respective reduced component description (RCD), in accordance with various example embodiments.

Referring now to FIG. 4, the component description optimization component obtains, from the PCBA BOM, a group of component descriptions (401). In turn, for each component description (402, 404) of the group of component descriptions, the alphanumeric character filtering component replaces non-alphanumeric characters (e.g., "-", ".", "_") of the component description with respective spaces to obtain a revised component description, and removes, from the revised component description, words that comprise numbers to obtain an RCD (412, 414).

Further, as illustrated by FIGS. 5 and 10, for each RCD (412, 414), the natural language expression component expands, using a defined knowledge base comprising an online library of information, respective words of the RCD (e.g., $W_1$ ("IC"), $W_2$ ("TPM"), and $W_3$ ("VQFN") of RCD 412; $W_1$ ("IC"), $W_2$ ("WLCP"), and $W_3$ ("PWM") of RCD 414) to obtain respective expanded words representing natural-language expressions of the respective words (e.g., "ic", "trusted platform module", "flat no-leads package", "chip-scale package", "pwm").

In embodiment(s), the natural language expression component expands the respective words of the RCD using a python-based interface corresponding to the defined knowledge base comprising the online library of information. In other embodiment(s), in response to determining that a word of the respective words cannot be represented by an expanded word of the respective expanded words, the natural language expression component uses the word as the expanded word.

Now referring to FIGS. 6-8 and 11-13, for each RCD (412, 414), the scoring component, based on the group of defined valid label designations, the group of defined invalid label designations, and the respective expanded words, selects, using a zero-shot model comprising a pre-trained machine learning model, a group of words from the RCD to be included in a final RCD representing the accepted domain of component class descriptions.

In this regard, in various embodiment(s) illustrated by FIGS. 6-8 and 11-13, for each word ($W_1$, $W_2$, and $W_3$) of the RCD (e.g., "IC", "TPM", and "VQFN" of RCD 412; "IC", "WLCP", and "PWM" of RCD 414), the scoring component utilizes the zero-shot model, e.g., a zero-shot AI model (e.g., https://huggingface.co/facebook/bart-large-mnli) to compare each expanded word of the respective expanded words with the group of defined valid label designations and the group of defined invalid label designations to generate zero-shot similarity scores between the expanded word and respective defined label designations of the group of defined valid label designations and the group of defined invalid label designations.

In turn, the scoring component determines a valid label score for each word ($W_1$, $W_2$, and $W_3$) of the RCD (e.g., "IC", "TPM", and "VQFN" of RCD 412, respectively; "IC", "WLCP", and "PWM" of RCD 414, respectively)—the valid label score equal to an average of zero-shot similarity scores for all valid label designations corresponding to the word of the RCD. Further, the scoring component determines an invalid label score, e.g., average invalid label similarity score, for each word ($W_1$, $W_2$, and $W_3$) of the RCD (e.g., "IC", "TPM", and "VQFN" of RCD 412, respectively; "IC", "WLCP", and "PWM" of RCD 414, respectively)—the invalid label score equal to an average of zero-shot similarity scores for all invalid label designations corresponding to the word of the RCD.

The scoring component determines a valid ratio equal to a ratio of the valid label score for the word to the invalid label score for the word. Further, in response to determining that the valid ratio satisfies a valid ratio condition, e.g., that the valid ratio is less than 1, and in response to determining that invalid label score satisfies an invalid label score condition, e.g., that the invalid label score is greater than 0.4, the scoring component rejects the word from being included in the final RCD; otherwise, the scoring component includes the word in the final RCD.

As illustrated by FIGS. 6-8, a valid label score for word $W_1$ ("IC") of RCD 412=(0.93+0.42+0.36)/3=0.57, an invalid label score for word $W_1$ ("IC") of RCD 412=0.76, and the valid ratio=0.57/0.76=0.75; a valid label score for word $W_2$ ("TPM") of RCD 412=(0.27+0.11+0.03)/3=0.14, an invalid label score for word $W_2$ ("TPM") of RCD 412=0.08, and the valid ratio=0.14/0.08=1.75; and a valid label score for word $W_3$ ("VQFN") of RCD 412=(0.70+0.44+0.29)/3=0.48, an invalid label score for word $W_3$ ("VQFN") of RCD 412=0.55, and the valid ratio=0.48/0.55=0.87.

In turn, as illustrated by FIG. 9, in response to determining that the valid ratio for the word "IC" of RCD 412 is less than 1, and in response to determining that the invalid label score for the word "IC" of RCD 412 is greater than 0.4, the scoring component rejects the word "IC" of RCD 412 from being included in the final RCD corresponding to RCD 412.

Further, in response to determining that the valid ratio for the word "TPM" of RCD 412 is greater than 1, and in response to determining that the invalid label score for the word "TPM" of RCD 412 is less than 0.4, the scoring component includes the word "TPM" of RCD 412 in the final RCD corresponding to RCD 412.

In addition, in response to determining that the valid ratio for the word "VQFN" of RCD 412 is less than 1, and in response to determining that the invalid label score for the word "VQFN" of RCD 412 is greater than 0.4, the scoring component rejects the word "VQFN" of RCD 412 from being included in the final RCD corresponding to RCD 412.

As illustrated by FIGS. 11-13, a valid label score for word $W_1$ ("IC") of RCD 414=(0.93+0.42+0.36)/3=0.57, an invalid label score for word $W_1$ ("IC") of RCD 414=0.76, and the valid ratio=0.57/0.76=0.75; a valid label score for word $W_2$ ("WLCSP") of RCD 414=(0.68+0.60+0.13)/3=0.47, an invalid label score for word $W_2$ ("WLCSP") =0.70, and the valid ratio=0.47/0.70=0.67; and a valid label score for word $W_3$ ("PWM") of RCD 414=(0.89+0.36+0.80)/3=0.68, an invalid label score for word $W_3$ ("PWM") of RCD 414=0.13, and the valid ratio=0.68/0.13=5.23.

In turn, as illustrated by FIG. 14, in response to determining that the valid ratio for the word "IC" of RCD 414 is less than 1, and in response to determining that the invalid label score for the word "IC" of RCD 414 is greater than 0.4, the scoring component rejects the word "IC" of RCD 414 from being included in the final RCD corresponding to RCD 414.

Further, in response to determining that the valid ratio for the word "WLCSP" of RCD 414 is less than 1, and in response to determining that the invalid label score for the word "WLCSP" of RCD 414 is greater than 0.4, the scoring component rejects the word "WLCSP" of RCD 414 from being included in the final RCD corresponding to RCD 414.

In addition, in response to determining that the valid ratio for the word "PWM" of RCD 414 is greater than 1, and in response to determining that the invalid label score for the word "PWM" of RCD 414 is less than 0.4, the scoring component includes the word "PWM" of RCD 414 in the final RCD corresponding to RCD 414.

FIGS. 15-19 illustrate methodologies for facilitating reduction of noise in non-standard PCBA component descriptions, e.g., due to lack in uniformity of component descriptions, by using a zero-shot model to identify salient component class descriptions, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 15:
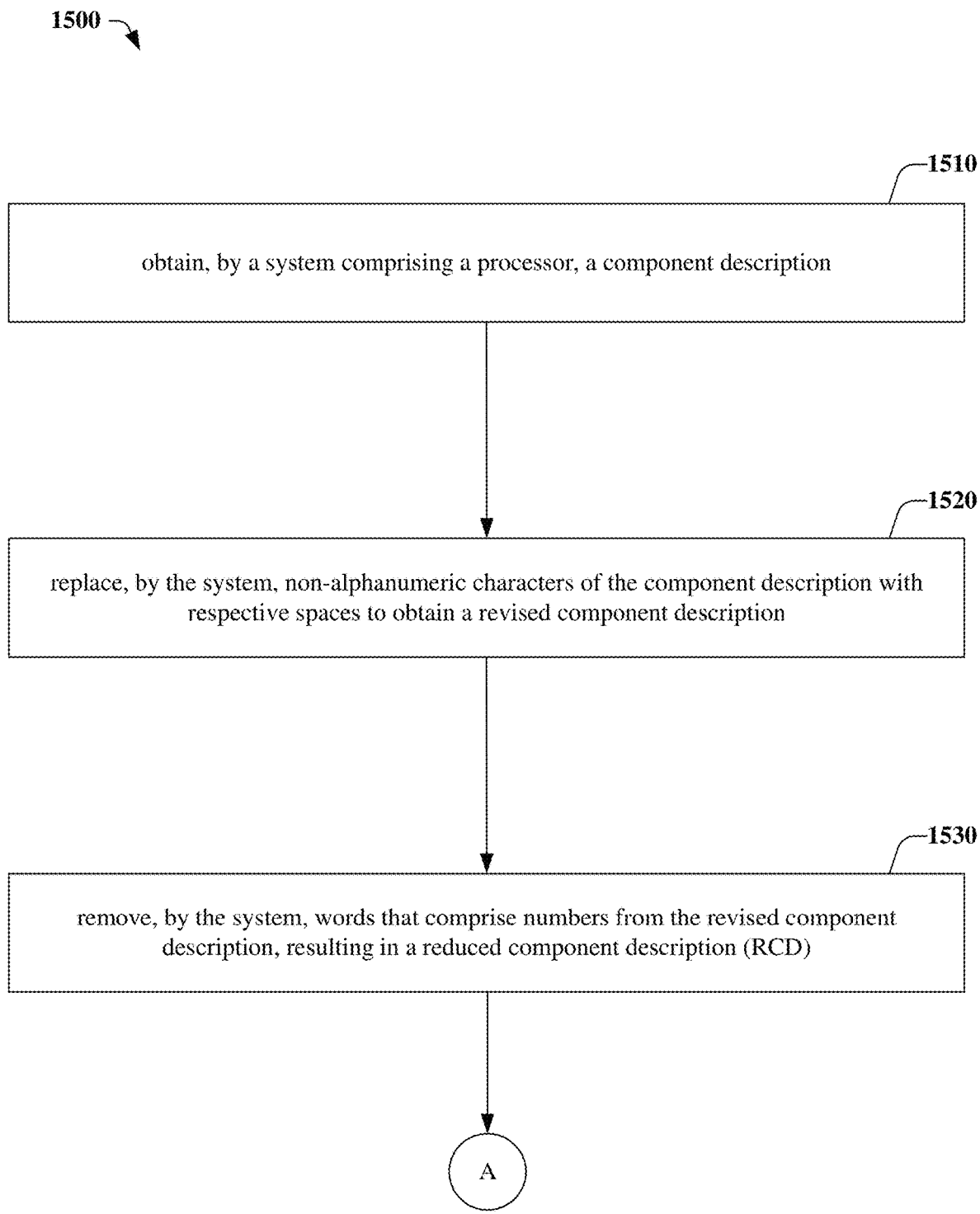
FIGS. 15-16 illustrate flow charts of a method that facilitates reduction of noise in non-standard PCBA component descriptions using a zero-shot model to identify salient component class descriptions, in accordance with various example embodiments.
Figure 16:
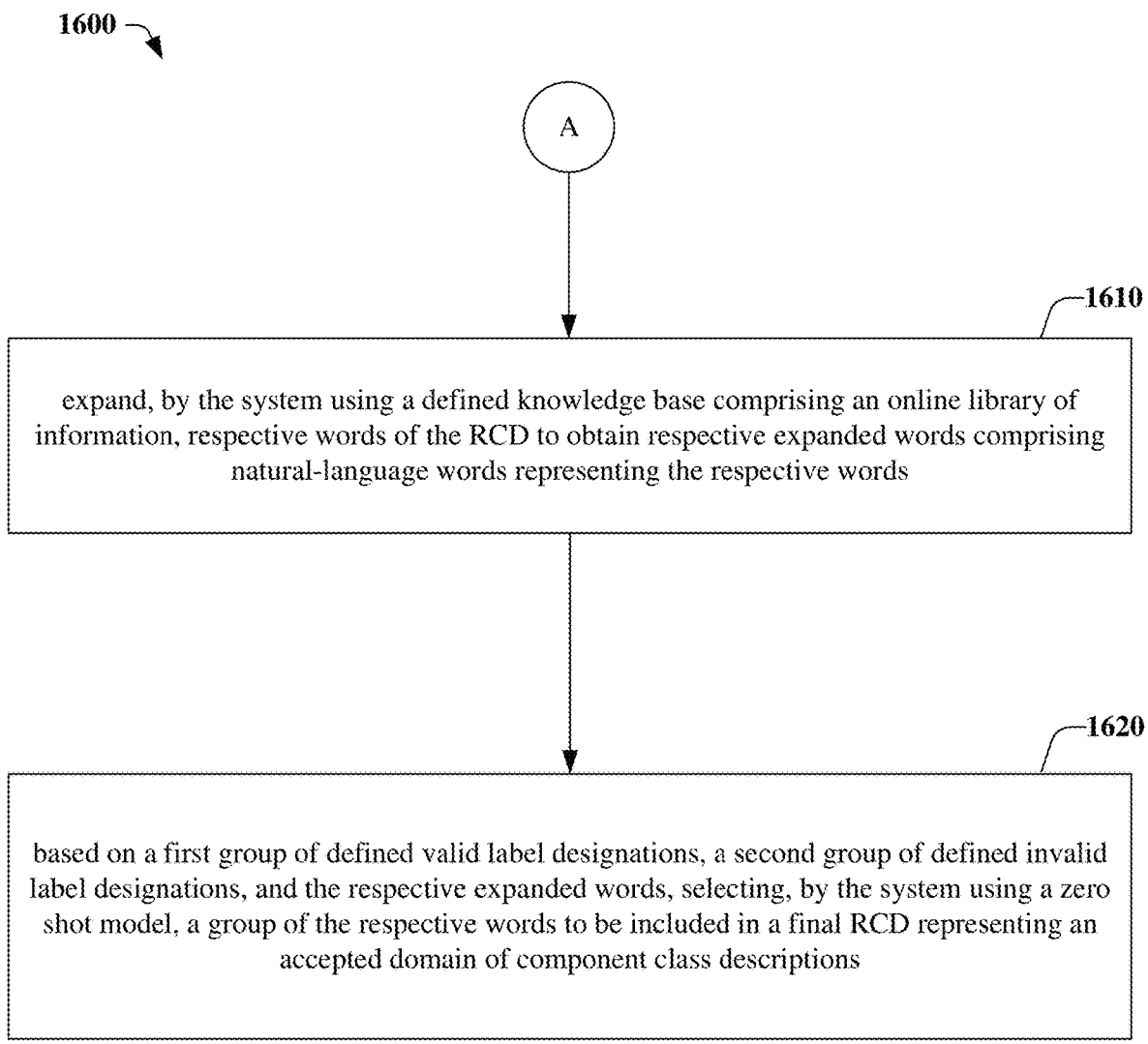

Referring now to FIGS. 15-16, flow charts (1500, 1600) of a method that facilitates reduction of noise in non-standard PCBA component descriptions using a zero-shot model to identify salient component class descriptions, in accordance with various example embodiments.

At 1510, a system (e.g., 110) comprising a processor obtains a component description. At 1520, the system replaces non-alphanumeric characters of the component description with respective spaces to obtain a revised component description. At 1530, the system removes words that comprise numbers from the revised component description, resulting in an RCD.

At 1610, the system expands, using a defined knowledge base comprising an online library of information, respective words of the RCD to obtain respective expanded words comprising natural-language words representing the respective words.

At 1620, based on a first group of defined valid label designations, a second group of defined invalid label designations, and the respective expanded words, the system selects, using a zero-shot model, a group of the respective words to be included in a final RCD representing an accepted domain of component class descriptions.

Figure 17:
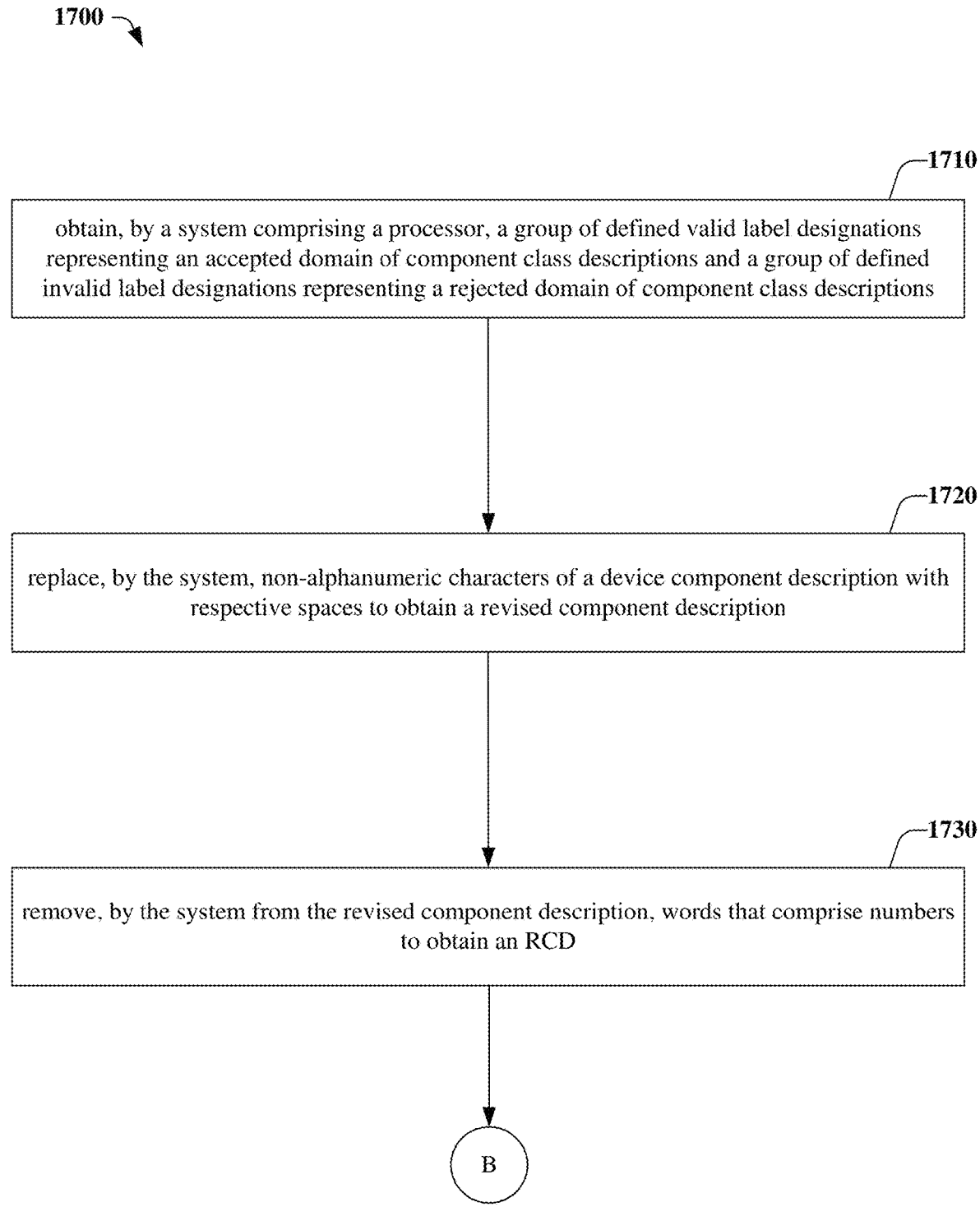
FIGS. 17-19 illustrate flow charts of another method that facilitates reduction of noise in non-standard PCBA component descriptions using a zero-shot model to identify salient component class descriptions, in accordance with various example embodiments.
Figure 18:
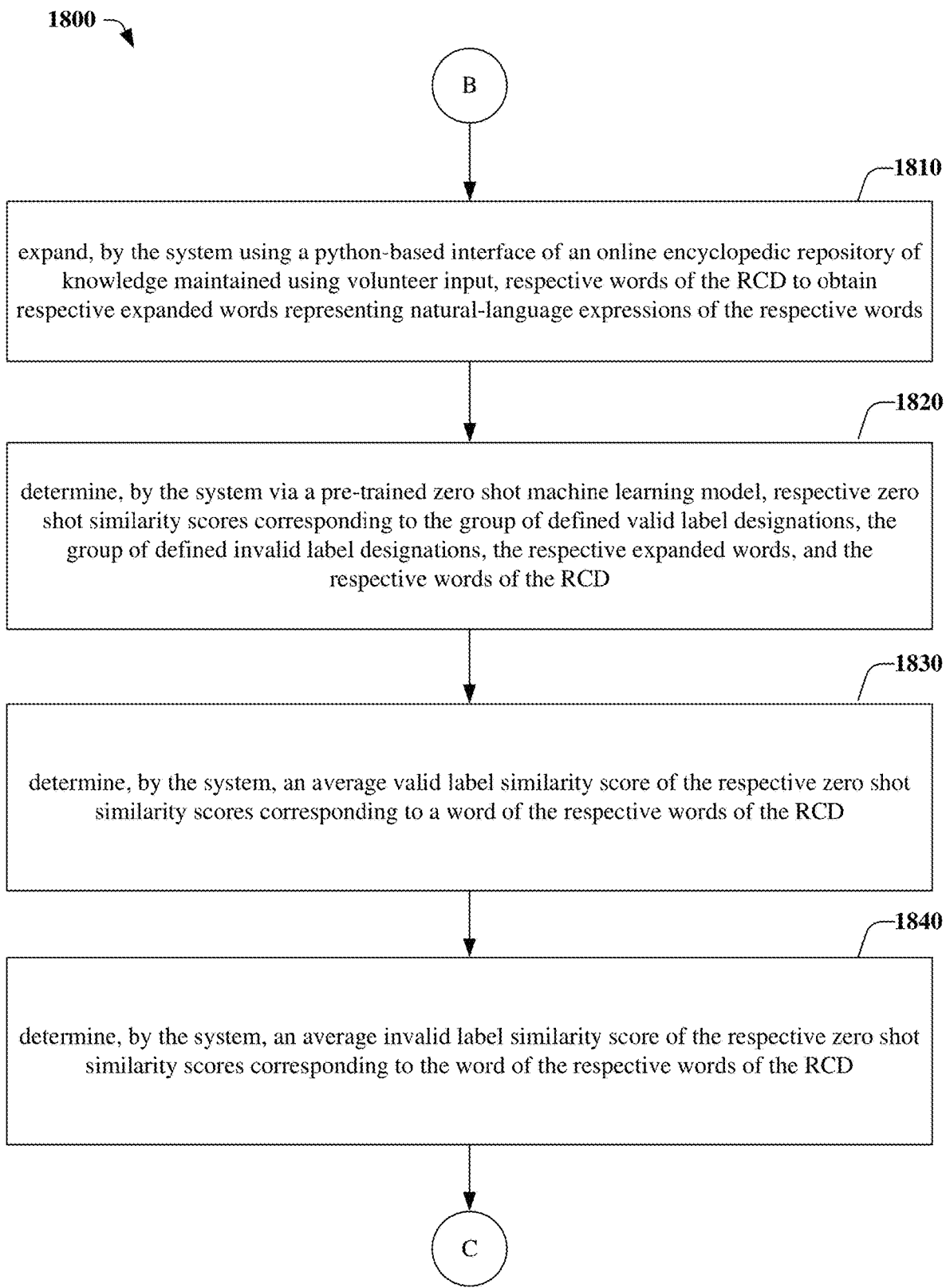
Figure 19:
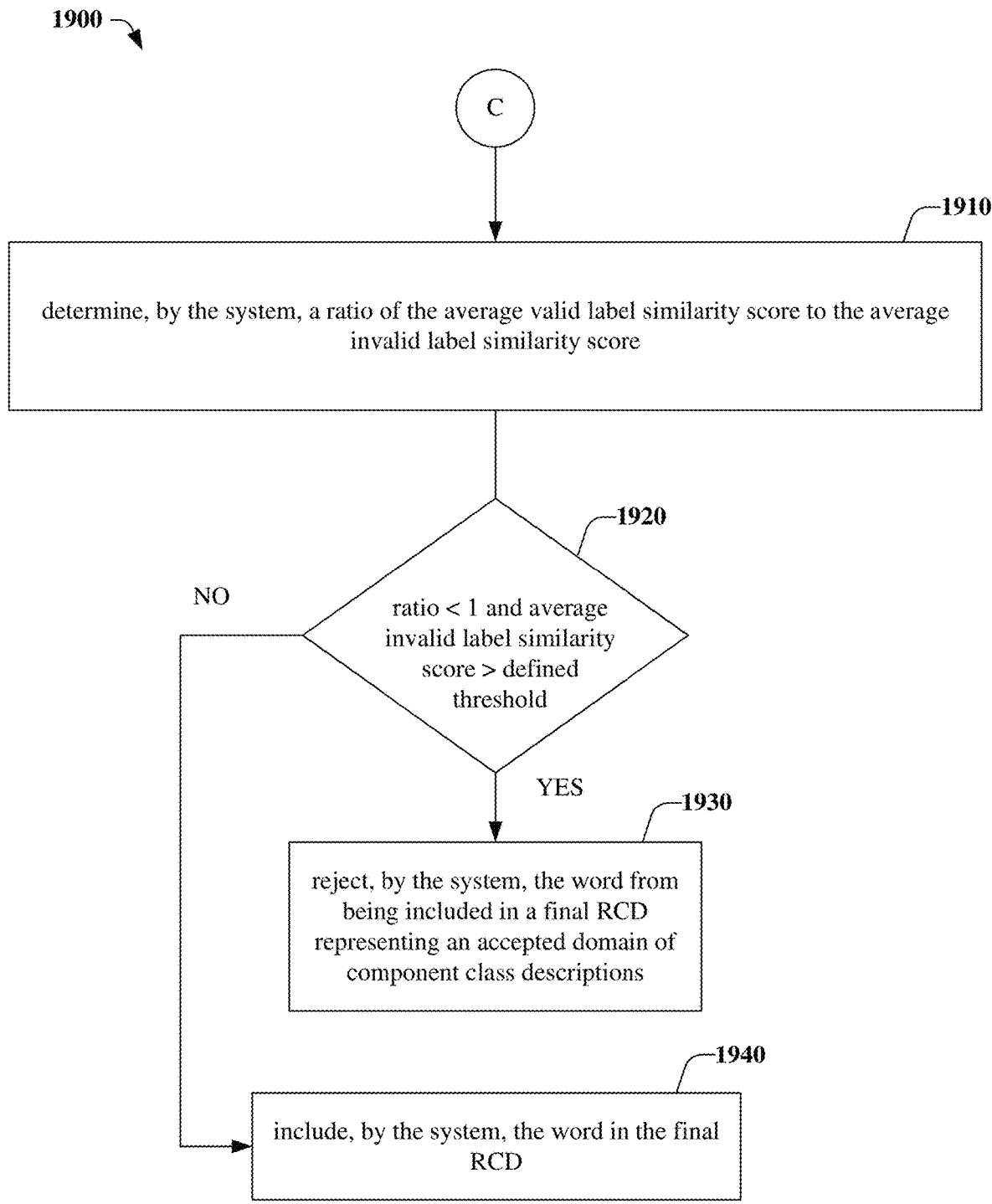

FIGS. 17-19 illustrate flow charts (1700, 1800, 1900) of another method that facilitates reduction of noise in non-standard PCBA component descriptions using a zero-shot model to identify salient component class descriptions, in accordance with various example embodiments.

At 1710, a system (e.g., 110) comprising a processor obtains a group of defined valid label designations representing an accepted domain of component class descriptions and a group of defined invalid label designations representing a rejected domain of component class descriptions.

At 1720, the system replaces non-alphanumeric characters of a component description with respective spaces to obtain a revised component description.

At 1730, the system removes, from the revised component description, words that comprise numbers to obtain an RCD.

At 1810, the system expands, using a python-based interface of an online encyclopedic repository of knowledge maintained using volunteer input, respective words of the RCD to obtain respective expanded words representing natural-language expressions of the respective words.

At 1820, the system determines, via a pre-trained zero-shot machine learning model, respective zero-shot similarity scores corresponding to the group of defined valid label designations, the group of defined invalid label designations, the respective expanded words, and the respective words of the RCD.

At 1830, the system determines an average valid label similarity score of the respective zero-shot similarity scores corresponding to a word of the respective words of the RCD.

At 1840, the system determines an average invalid label similarity score of the respective zero-shot similarity scores corresponding to a word of the respective words of the RCD.

At 1910, the system determines a ratio of the average valid label similarity score to the average invalid label similarity score.

At 1920, the system determines whether the ratio satisfies a defined ratio condition, e.g., that the ratio is less than 1, and determines whether the average invalid label similarity score satisfies a defined average similarity condition, e.g., that the average invalid label similarity score is greater than 0.4.

In this regard, in response to determining that the ratio is less than 1, and that the average invalid label similarity score is greater than 0.4, flow continues to 1930, at which the system rejects the word from being included in a final RCD representing an accepted domain of component class descriptions; otherwise, flow continues to 1940, at which the system includes the word in the final RCD.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "label component", "component description optimization component", "alphanumeric character filtering component", "natural language expression component", "scoring component", "system", and the like are intended to refer to a computer-related entity, hardware, software (e.g., in execution), and/or firmware. For example, a component referenced by such terms can be a processor, a process running on a processor, an object, an executable, a program, a storage device, and/or a computer. By way of illustration, an application running on a server, client, etc. and the server, client, etc. can be such component(s), and such component(s) can reside within a process, and can be localized on one computer and/or distributed between two or more computers.

Further, such components can execute from various computer readable media having various data structures stored thereon, and can communicate via local and/or remote processes such as in accordance with a signal having one or more data packets (e.g., data from one component interacting with another component in a local system, distributed system, and/or across a network, e.g., the Internet, with other systems via the signal).

As another example, such component(s) can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, such component(s) can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

As it is employed in the subject specification, the term "processor", "processing component", etc. can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data store", "data storage", "storage device", "storage medium", "memory component", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a BOM (102, 104), non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1020) can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 20:
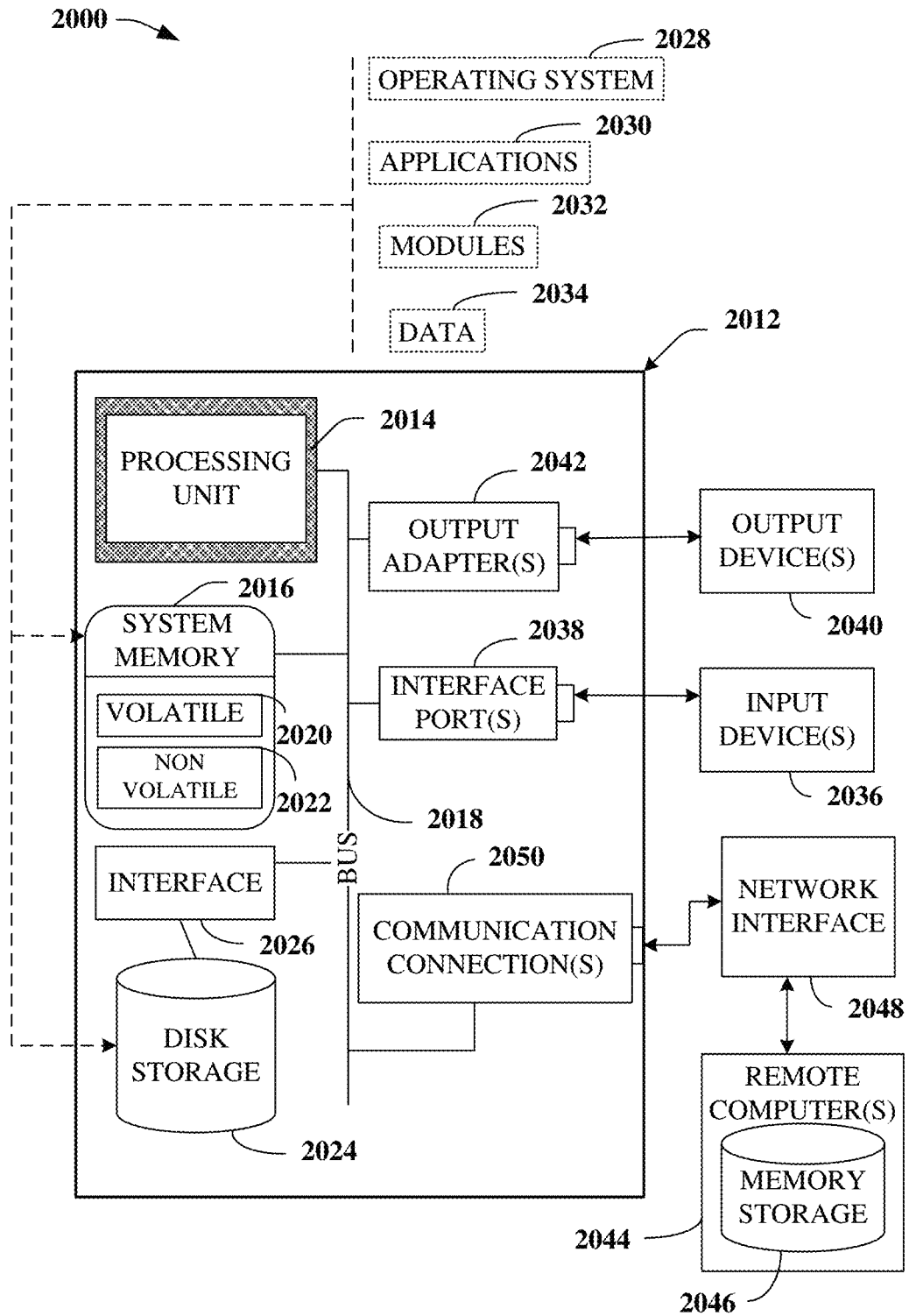
FIG. 20 illustrates a block diagram representing an illustrative non-limiting computing system or operating environ-

In order to provide a context for the various aspects of the disclosed subject matter, FIG. 20, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 20, a block diagram of a computing system 2000, e.g., 110, operable to execute the disclosed systems and methods is illustrated, in accordance with an embodiment. Computer 2012 comprises a processing unit 2014, a system memory 2016, and a system bus 2018. System bus 2018 couples system components comprising, but not limited to, system memory 2016 to processing unit 2014. Processing unit 2014 can be any of various available processors. Dual microprocessors and other multiprocessor architectures also can be employed as processing unit 2014.

System bus 2018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 2016 comprises volatile memory 2020 and nonvolatile memory 2022. A basic input/output system (BIOS), containing routines to transfer information between elements within computer 2012, such as during start-up, can be stored in nonvolatile memory 2022. By way of illustration, and not limitation, nonvolatile memory 2022 can comprise ROM, PROM, EPROM, EEPROM, or flash memory. Volatile memory 2020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2012 also comprises removable/non-removable, volatile/non-volatile computer storage media. FIG. 20 illustrates, for example, disk storage 2024. Disk storage 2024 comprises, but is not limited to, devices like a magnetic disk drive, floppy disk drive, tape drive, Jaz drive, Zip drive, LS-100 drive, flash memory card, or memory stick. In addition, disk storage 2024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2024 to system bus 2018, a removable or non-removable interface is typically used, such as interface 2026.

It is to be appreciated that FIG. 20 describes software that acts as an intermediary between users and computer resources described in suitable operating environment 2000. Such software comprises an operating system 2028. Operating system 2028, which can be stored on disk storage 2024, acts to control and allocate resources of computer system 2012. System applications 2030 take advantage of the management of resources by operating system 2028 through program modules 2032 and program data 2034 stored either in system memory 2016 or on disk storage 2024. It is to be appreciated that the disclosed subject matter can be implemented with various operating systems or combinations of operating systems.

A user can enter commands or information into computer 2012 through input device(s) 2036. Input devices 2036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 2014 through system bus 2018 via interface port(s) 2038. Interface port(s) 2038 comprise, for example, a serial port, a parallel port, a game port, a universal serial bus (USB), a wireless based port, e.g., Wi-Fi, Bluetooth, etc. Output device(s) 2040 use some of the same type of ports as input device(s) 2036.

Thus, for example, a USB port can be used to provide input to computer 2012 and to output information from computer 2012 to an output device 2040. Output adapter 2042 is provided to illustrate that there are some output devices 2040, like display devices, light projection devices, monitors, speakers, and printers, among other output devices 2040, which use special adapters. Output adapters 2042 comprise, by way of illustration and not limitation, video and sound devices, cards, etc. that provide means of connection between output device 2040 and system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. Remote computer(s) 2044 can be a personal computer, a server, a router, a network PC, a workstation, a microprocessor based appliance, a peer device, or other common network node and the like, and typically comprises many or all of the elements described relative to computer 2012.

For purposes of brevity, only a memory storage device 2046 is illustrated with remote computer(s) 2044. Remote computer(s) 2044 is logically connected to computer 2012 through a network interface 2048 and then physically and/or wirelessly connected via communication connection 2050. Network interface 2048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 2050 refer(s) to hardware/software employed to connect network interface 2048 to bus 2018. While communication connection 2050 is shown for illustrative clarity inside computer 2012, it can also be external to computer 2012. The hardware/software for connection to network interface 2048 can comprise, for example, internal and external technologies such as modems, comprising regular telephone grade modems, cable modems and DSL modems, wireless modems, ISDN adapters, and Ethernet cards.

The computer 2012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 2012 can connect to other devices/networks by way of antenna, port, network interface adaptor, wireless access point, modem, and/or the like.

The computer 2012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    at least one processor; and
    at least one memory that stores executable components that, when executed by the at least one processor, facilitate performance of operations by the system, the operations comprising:
        receiving a group of defined valid label designations representing an accepted domain of component class descriptions;
        receiving a group of defined invalid label designations representing a rejected domain of component class descriptions; and
        for each component description of a group of component descriptions,
            replacing non-alphanumeric characters of the component description with respective spaces to obtain a revised component description,
            removing, from the revised component description, words that comprise numbers to obtain a reduced component description,
            expanding, using a defined knowledge base comprising an online library of information, respective words of the reduced component description to obtain respective expanded words representing natural-language expressions of the respective words of the reduced component description,
            based on the group of defined valid label designations, the group of defined invalid label designations, and the respective expanded words, selecting, using a zero-shot model comprising a pretrained machine learning model, a group of words from the reduced component description to be included in a final reduced component description representing the accepted domain of component class descriptions, and
            based on a defined error condition and using a group of machine learning models, selecting the final reduced component description as a candidate of a component failure.

2. The system of claim 1, wherein the group of defined valid label designations represents the accepted domain comprising an electronic device manufacturing domain, a medical domain, an industrial domain, or a financial domain.

3. The system of claim 1, wherein the component description comprises unstructured data.

4. The system of claim 1, wherein the component description comprises a printed circuit board assembly component description.

5. The system of claim 4, wherein the selecting comprises:
    including the final reduced component description in a bill of materials (BOM); and
    selecting, via the BOM, the final reduced component description as the candidate of the component failure.

6. The system of claim 1, wherein the online library of information comprises a multilingual online encyclopedia maintained by volunteer input.

7. The system of claim 6, wherein the expanding of the respective words further comprises:
determining, utilizing a python-based interface of a multilingual online encyclopedia maintained by volunteer input, the respective expanded words representing the natural-language expressions of the respective words.

8. The system of claim 7, wherein the expanding of the respective words further comprises:
in response to determining that a word of the respective words cannot be represented by an expanded word of the respective expanded words, using the word as the expanded word.

9. The system of claim 1, wherein selecting the group of words from the reduced component description comprises:
generating, for an expanded word of the respective expanded words corresponding to a word of the group of words, respective zero-shot similarity scores for the group of defined valid label designations and the group of defined invalid label designations; and
based on the respective zero-shot similarity scores, selecting the word to be included in the final reduced component description.

10. The system of claim 9, wherein the generating of the respective zero-shot similarity scores further comprises:
in response to determining that the group of defined valid label designations comprises more than one defined valid label designation, determining an average valid label zero-shot similarity score of the respective zero-shot similarity scores corresponding to the group of defined valid label designations; and
based on the average valid label zero-shot similarity score, selecting the word to be included, or otherwise excluded, in the final reduced component description.

11. The system of claim 10, wherein the operations further comprise:
in response to determining that the group of defined invalid label designations comprises more than one defined invalid label designation, determining an average invalid label zero-shot similarity score of the respective zero-shot similarity scores corresponding to the group of defined invalid label designations; and
based on the average invalid label zero-shot similarity score, selecting the word to be included, or otherwise excluded, in the final reduced component description.

12. The system of claim 11, wherein the selecting of the word further comprises:
in response to determining that a ratio of the average valid label zero-shot similarity score to the average invalid label zero-shot similarity score satisfies a defined condition representing that the word is to be included in the final reduced component description, including the word in the final reduced component description.

13. A method, comprising:
obtaining, by a system comprising at least one processor, a component description;
replacing, by the system, non-alphanumeric characters of the component description with respective spaces to obtain a revised component description;
removing, by the system, words that comprise numbers from the revised component description, resulting in a reduced component description;
expanding, by the system using a defined knowledge base comprising an online library of information, respective words of the reduced component description to obtain respective expanded words comprising natural-language words representing the respective words;
based on a first group of defined valid label designations, a second group of defined invalid label designations, and the respective expanded words, selecting, by the system using a zero-shot model, a group of the respective words to be included in a final reduced component description representing an accepted domain of component class descriptions; and
based on a defined error condition, selecting, by the system via a machine learning model, a candidate of a component failure from the final reduced component description.

14. The method of claim 13, wherein the expanding of the respective words comprises:
determining, utilizing a python-based interface of the online library of information, the respective expanded words.

15. The method of claim 14, further comprising:
in response to determining that a word of the respective words cannot be represented by an expanded word of the respective expanded words, using, by the system, the word as the expanded word.

16. The method of claim 13, wherein the selecting of the group of the respective words to be included in the final reduced component description comprises:
generating, for the respective expanded words, respective zero-shot similarity scores corresponding to the group of defined valid label designations and the group of defined invalid label designations; and
based on the respective zero-shot similarity scores, selecting the group of the respective words to be included in the final reduced component description.

17. The method of claim 16, wherein the generating of the respective zero-shot similarity scores further comprises:
determining an average valid label zero-shot similarity score of the respective zero-shot similarity scores corresponding to the group of defined valid label designations; and
determining an average invalid label zero-shot similarity score of the respective zero-shot similarity scores corresponding to the group of defined invalid label designations.

18. The method of claim 17, wherein the selecting of the group of the respective words to be included in the final reduced component description further comprises:
based on a ratio of the average valid label zero-shot similarity score to the average invalid label zero-shot similarity score, selecting the group of the respective words to be included in the final reduced component description.

19. A non-transitory machine-readable medium comprising instructions that, in response to execution, cause a system comprising at least one processor to perform operations, the operations comprising:
obtaining a group of defined valid label designations representing an accepted domain of component class descriptions and a group of defined invalid label designations representing a rejected domain of component class descriptions;
replacing non-alphanumeric characters of a component description with respective spaces to obtain a revised component description;
removing, from the revised component description, words that comprise numbers to obtain a reduced component description;

expanding, using a python-based interface of an online encyclopedic repository of knowledge maintained using volunteer input, respective words of the reduced component description to obtain respective expanded words representing natural-language expressions of the respective words;

determining, via a pre-trained zero-shot machine learning model, respective zero-shot similarity scores corresponding to the group of defined valid label designations, the group of defined invalid label designations, and the respective expanded words;

based on the respective zero-shot similarity scores, removing at least one word of the respective words from the reduced component description to obtain a final reduced component description representing the accepted domain of component class descriptions; and based on a defined error condition, selecting, using a machine learning model, a description of the final reduced component description as a candidate of a component failure corresponding to a bill of materials.

20. The non-transitory machine-readable medium of claim 19, wherein the removing of the at least one word comprises:

determining an average valid label zero-shot similarity score of the respective zero-shot similarity scores corresponding to the group of defined valid label designations and an expanded word of the respective expanded words;

determining an average invalid label zero-shot similarity score of the respective zero-shot similarity scores corresponding to the group of defined invalid label designations and the expanded word; and based on a ratio of the average valid label zero-shot similarity score to the average invalid label zero-shot similarity score, removing, from the reduced component description, a word of the respective words corresponding to the expanded word.

\* \* \* \* \*